(12) United States Patent
Specht et al.

(10) Patent No.: US 9,127,487 B2
(45) Date of Patent: Sep. 8, 2015

(54) TABLET CASE WITH SPRING-LOADED SLIDEABLE BRACKET

(71) Applicant: Block and Company, Inc., Wheeling, IL (US)

(72) Inventors: Paul E. Specht, Glenview, IL (US); John Sung-Heup Yang, Northbrook, IL (US)

(73) Assignee: Block and Company, Inc., Wheeling, IL (US)

( * ) Notice: Subject to any disclaimer, the term of this patent is extended or adjusted under 35 U.S.C. 154(b) by 0 days.

(21) Appl. No.: 14/294,529

(22) Filed: Jun. 3, 2014

(65) Prior Publication Data

US 2015/0191941 A1 Jul. 9, 2015

Related U.S. Application Data (60) Provisional application No. 61/964,609, filed on Jan. 8, 2014.

(51) Int. Cl.
| | |
|---|---|
| A47B 97/04 | (2006.01) |
| E05B 73/00 | (2006.01) |
| F16M 11/06 | (2006.01) |
| F16M 13/02 | (2006.01) |

(52) U.S. Cl.
CPC ............. *E05B 73/0082* (2013.01); *E05B 73/00* (2013.01); *F16M 11/06* (2013.01); *F16M 13/022* (2013.01)

(58) Field of Classification Search
CPC ...... E05B 73/0082; E05B 73/00; F16M 1/06; F16M 13/022
USPC ............... 248/346.04, 346.07, 447, 461, 462, 248/468, 918, 922, 923; 361/679.26, 361/679.29, 679.3
See application file for complete search history.

(56) References Cited

U.S. PATENT DOCUMENTS

| | | | |
|---|---|---|---|
| 4,106,742 A * | 8/1978 | Miller et al. | 248/488 |
| 6,601,931 B1 * | 8/2003 | Schairbaum et al. | 312/194 |
| 8,146,869 B2 * | 4/2012 | Wang et al. | 248/125.2 |
| 8,231,099 B2 * | 7/2012 | Chen | 248/688 |
| 2007/0011929 A1 * | 1/2007 | Cheng | 40/700 |
| 2008/0062624 A1 * | 3/2008 | Regen et al. | 361/680 |

* cited by examiner

*Primary Examiner* — Gwendolyn W Baxter
(74) *Attorney, Agent, or Firm* — Husch Blackwell, LLP (57) ABSTRACT

A case for a viewing device with a spring-loaded slide-able bracket.

18 Claims, 14 Drawing Sheets

TABLET CASE WITH SPRING-LOADED SLIDEABLE BRACKET

The present application claims the benefit of the filing date of U.S. provisional application Ser. No. 61/964,609, filed 8 Jan. 2014.

This invention pertains to a case for a viewing device, and particularly to one with a spring-loaded slide-able bracket.

BRIEF DESCRIPTION OF THE DRAWINGS

The following drawings illustrate the concepts of the present invention, and are not necessarily drawn to scale.

DETAILED DESCRIPTION OF SOME EMBODIMENTS

While the present invention is susceptible of embodiment in various forms, there is shown in the drawings and will hereinafter be described some embodiments with the understanding that the present disclosure is to be considered an exemplification of the invention and is not intended to limit the invention to the specific embodiments illustrated.

It is typical for an electronic display viewing device such as a tablet to be available at a retail establishment for potential customers to view, touch, and use before making a purchase decision. The retailer wants to give the potential customer that access while minimizing the opportunity for theft or damage. The viewing device can be retained in a tablet case that can be secured to prevent removal of the viewing device while still allowing a potential customer to use the viewing device.

An exemplary viewing device case includes at least one spring-loaded slide-able bracket for moving the viewing device into a viewing position, when the viewing device is inserted into the case.

Figure 1:
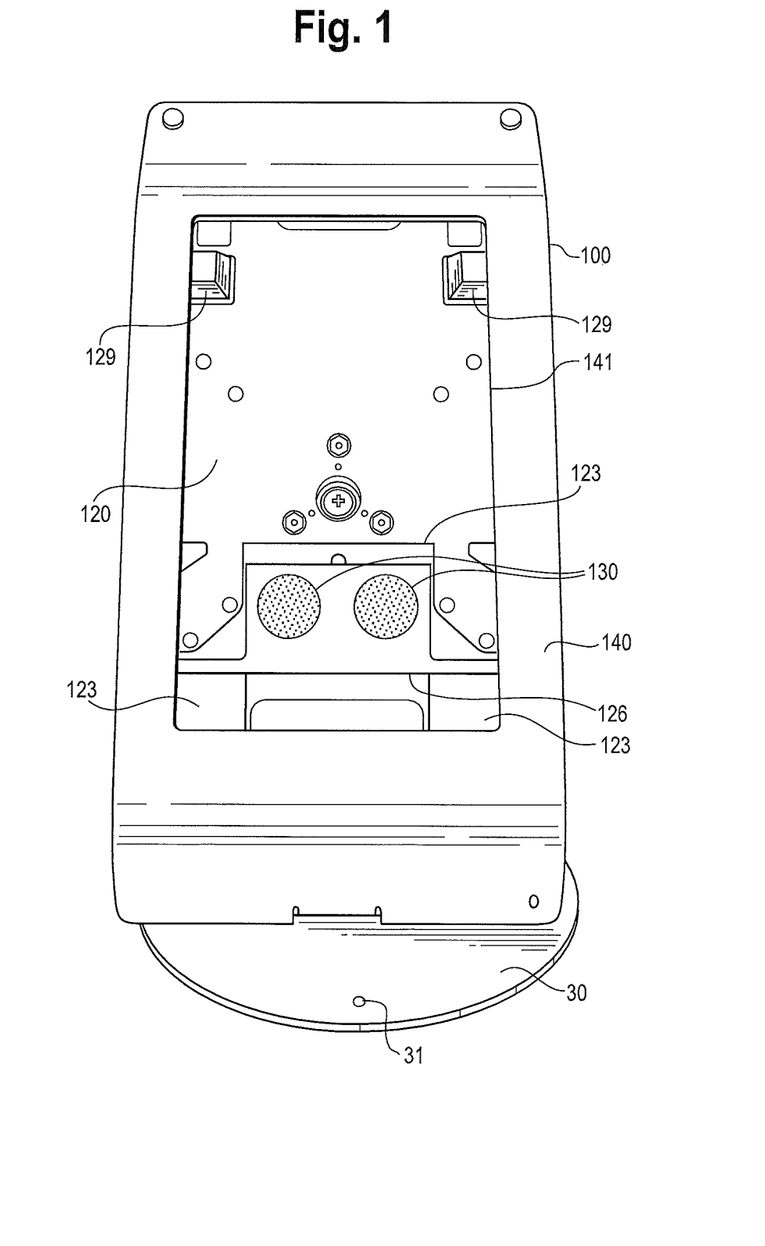
FIG. 1 is a front perspective view of a case attached to a stand.
Figure 2:
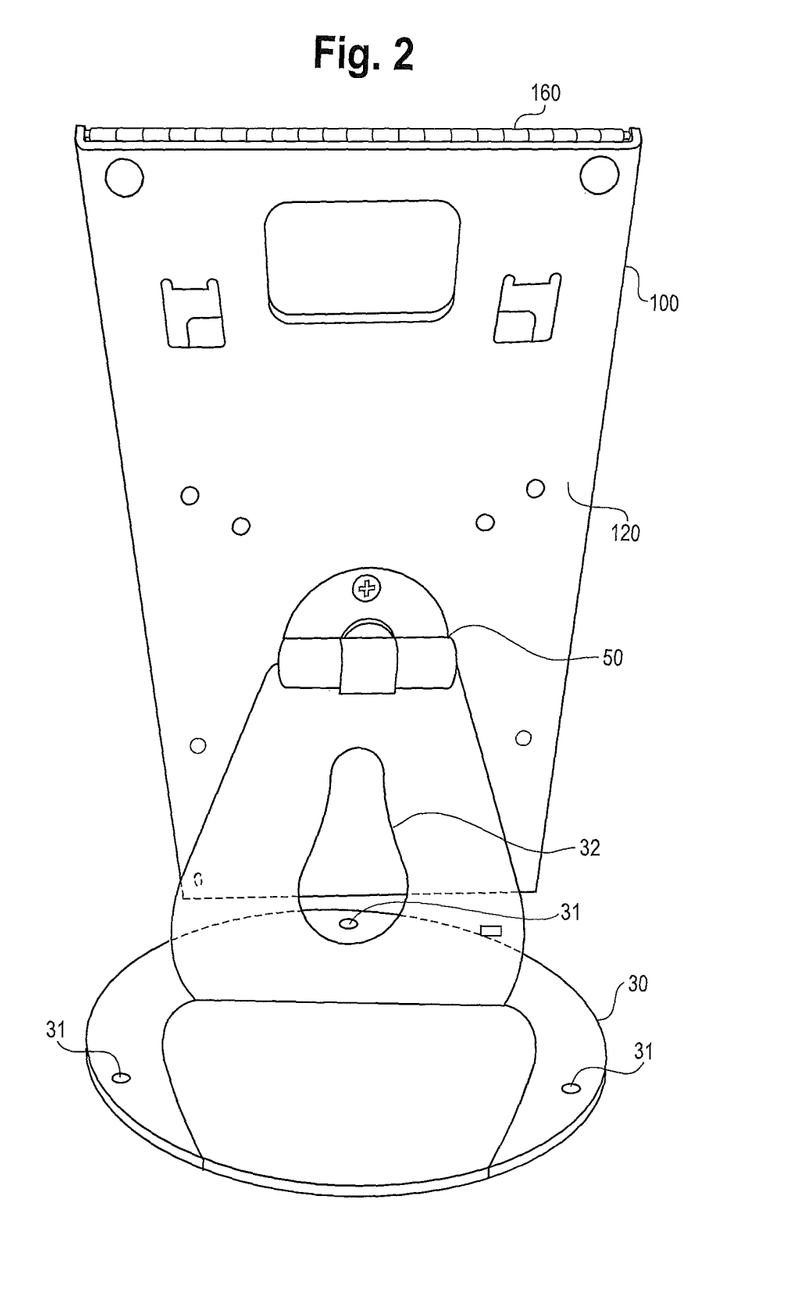
FIG. 2 is a rear perspective view of the case and stand of FIG. 1.
Figure 3:
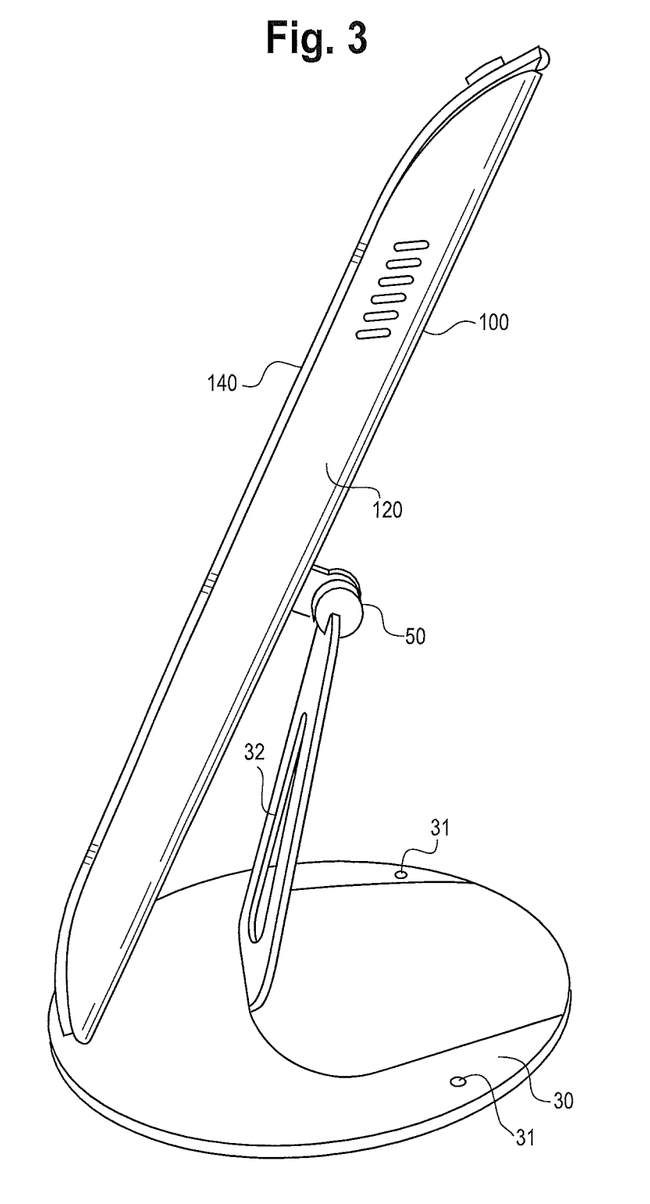
FIG. 3 is a left side perspective view of the case and stand of FIG. 1.
Figure 4:
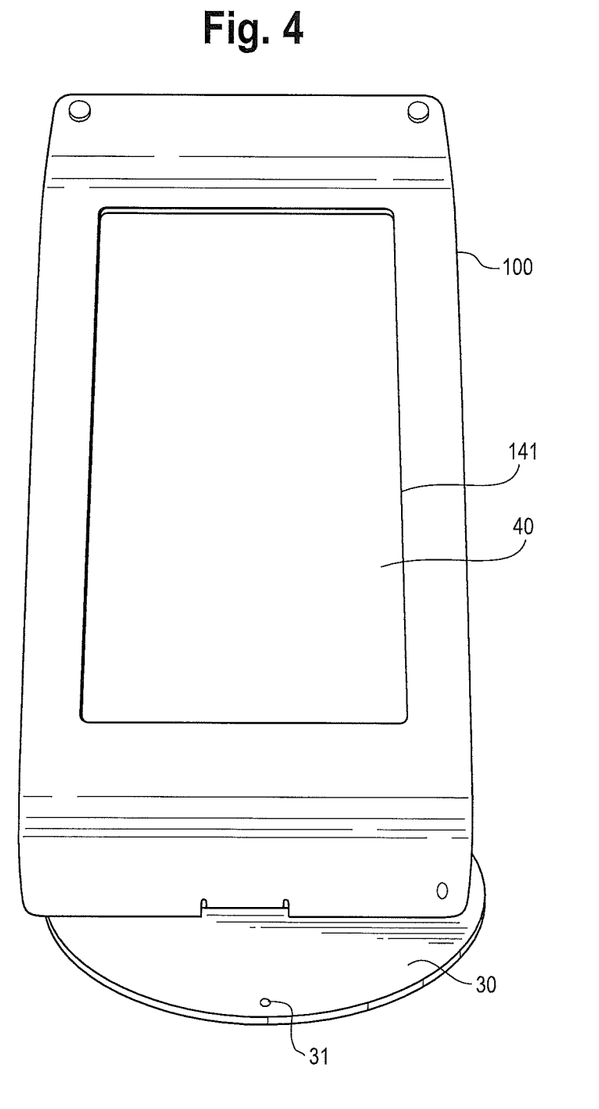
FIG. 4 is the view of FIG. 1 with a viewing device inserted into the case.
Figure 5:
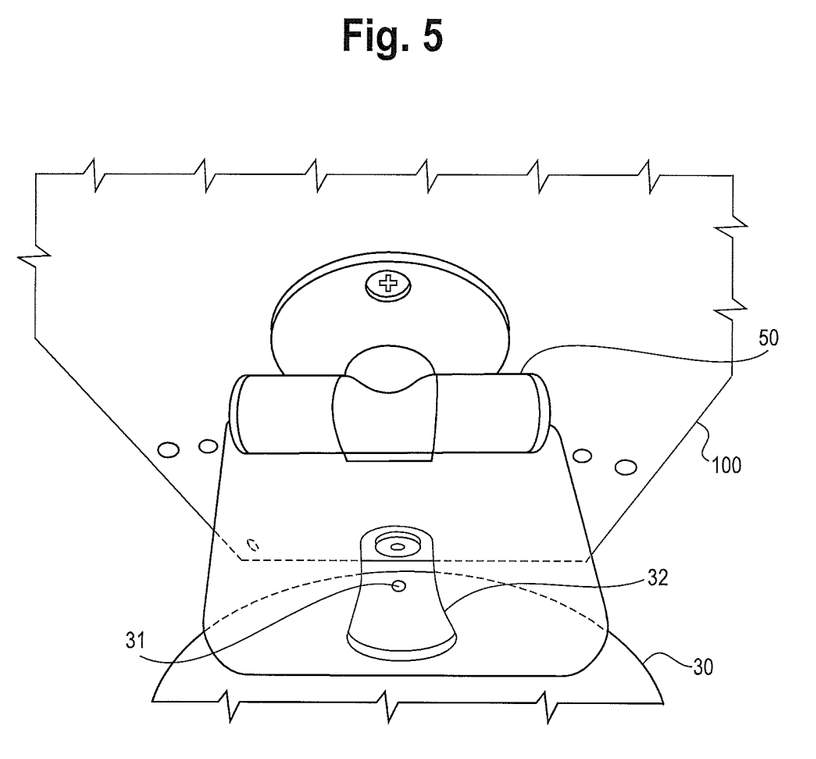
FIG. 5 is a partial rear bottom perspective detail of a swivel mount seen in FIGS. 2 and 3.

FIGS. 1-5 illustrate an example of an embodiment in which case 100 that is attached to a stand 30. FIGS. 1-3 show front, rear and side views of the closed case 100 attached to stand 30. Stand 30 defines small openings 31 through which stand 30 may be fastened to a counter, a shelf or a table, for example. It also defines an opening 32 through which wiring, such as a battery cable, can pass. Case 100 is attached to stand 30 by a swivel mount 50 that allows rotation about two axes, as is known in the art. FIG. 5 is a partial detail view showing the mount 50. FIG. 4 shows the same view as FIG. 1, with a viewing device 40 inserted into case 100.

Figure 6:
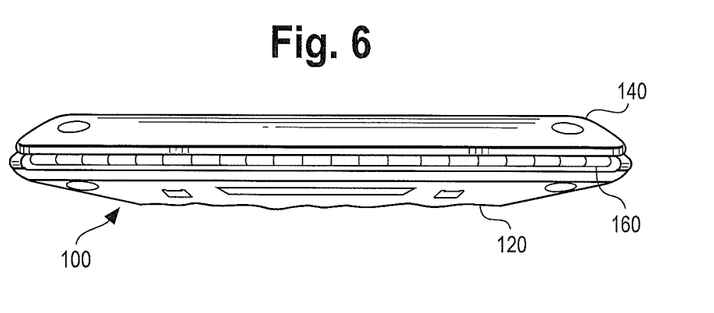
FIG. 6 is a top perspective view of the case of FIG. 1.
Figure 7:
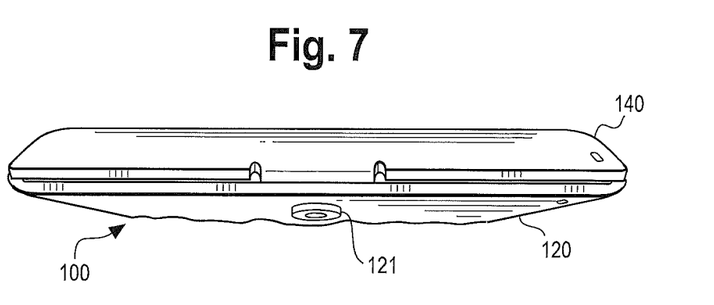
FIG. 7 is a bottom perspective view of the case of FIG. 1.

FIGS. 6 and 7 show top and bottom views of the case 100 of the example of FIG. 1, when case 100 is closed but not attached to stand 30. Case 100 comprises a base 120 and a cover 140, and a hinge 160 that rotatably attaches cover 140 to base 120. In other embodiments, there can be multiple smaller hinges, or other fasteners known in the art for attaching a cover to a base or otherwise allowing insertion of a viewing device into the case and then keeping it there.

Figure 10:
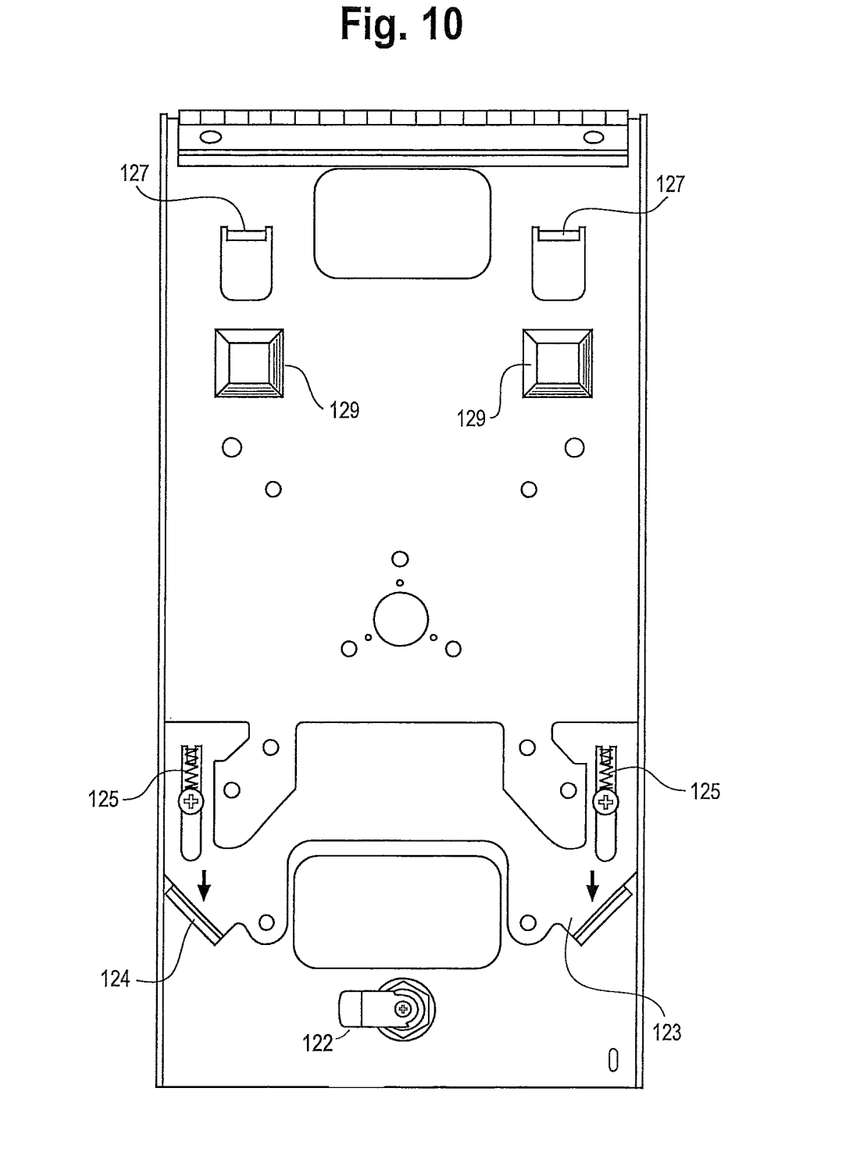
FIG. 10 is a plan view of the base of FIG. 8 with the retainer bracket removed, and showing the spring-loaded bracket.
Figure 11:
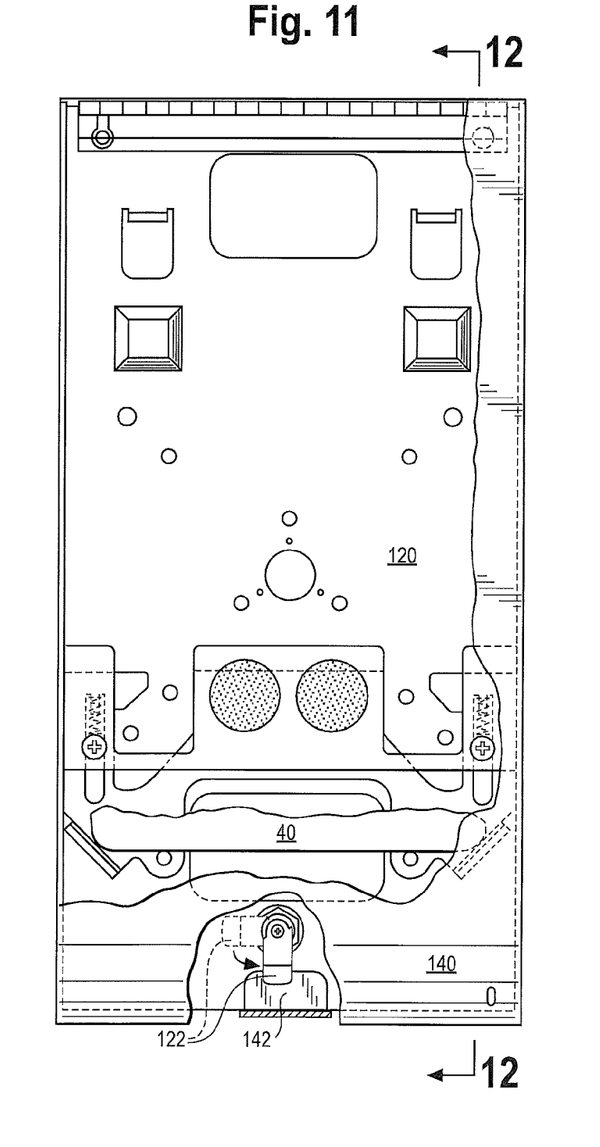
FIG. 11 is a plan view of the base of FIG. 8, showing a fragment of a viewing device that is inserted into the case, showing a fragment of the cover of the case that is closed over the base, and showing rotation of a locking latch.

In some embodiments, a lock can secure cover 140 in a closed position relative to base 120. As illustrated in FIGS. 7 and 10-12, a tubular lock 121 near the bottom of base 120 requires a key (not shown) to rotate a latch 122. When cover 140 is closed, latch 122 can be rotated behind a flange 142 that extends from the bottom of cover 140, preventing case 100 from being opened. The arrow in FIG. 11 shows the rotation of latch 122 from an unlocked to a locked position over flange 142.

In the illustrated example, the cover 140 defines a rectangular opening 141. In FIG. 1, cover 140 is closed over base 120 and an inside surface of base 120 is visible through opening 141. In FIG. 4, cover 140 is closed over base 120 after a viewing device 40 has been inserted in case 100, and a display screen of viewing device 140 is visible through opening 141.

Figure 8:
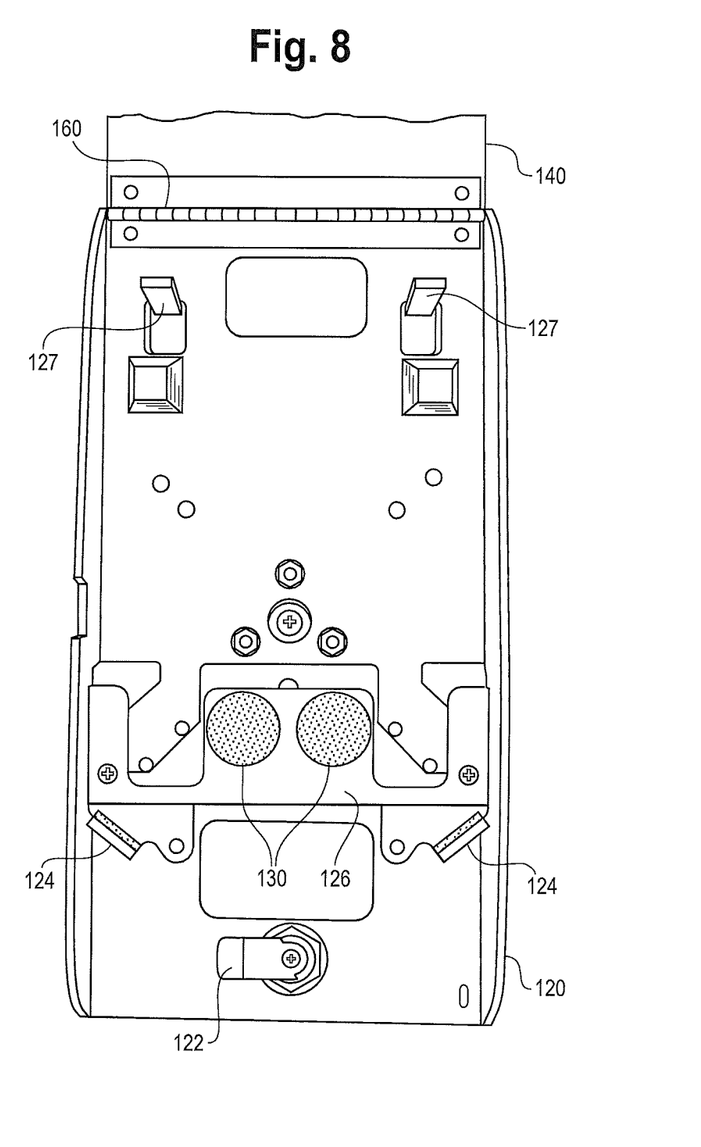
FIG. 8 is a perspective view of the inside of a base of an opened case of FIG. 1.

FIG. 8 shows one embodiment of the inside of the base 120 of an opened case 100 illustrated in FIG. 1. For the example of the case 100 illustrated in FIGS. 1-4, 6 and 7, cover 140 is swung open about hinge 160, allowing insertion of a viewing device 40. A screen of the viewing device 40 will be visible through opening 141, after the viewing device 40 is installed in case 100 and the cover 140 is closed over the base 120.

Figure 9:
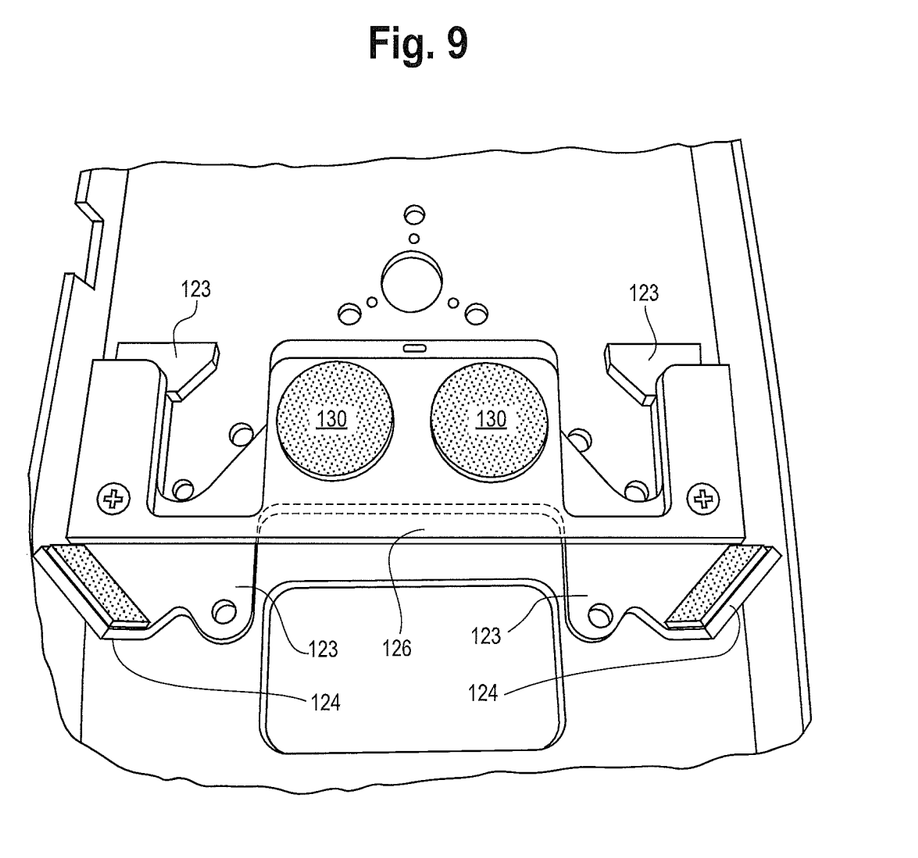
FIG. 9 is a partial perspective detail of part of FIG. 8, showing a spring-loaded slide-able bracket covered by a retainer bracket.
Figure 12:
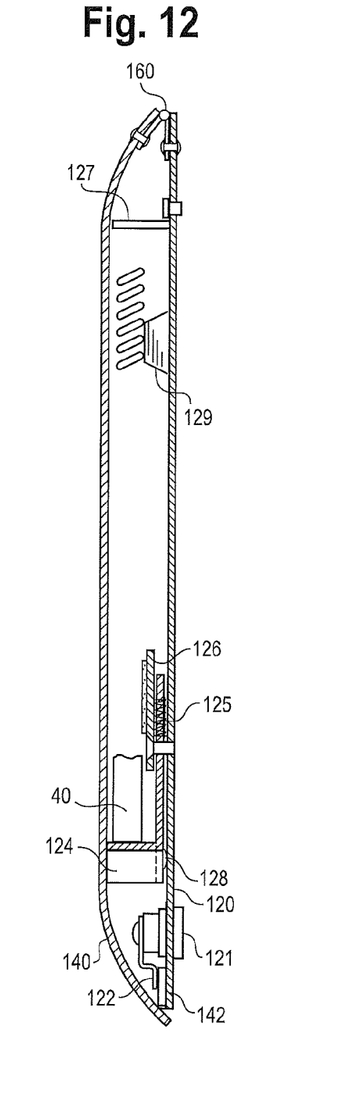
FIG. 12 is a cross-section view taken along 12-12 of FIG. 11.

The case 100 illustrated in FIG. 8 comprises a spring-loaded slide-able bracket 123 with two angled vertical tabs 124 and two compression springs 125. A retainer bracket 126 covers part of the slide-able bracket 123 including the springs 125, and retains them against the base 120. FIG. 9 is a partial detail view of the spring-loaded slide-able bracket 123 covered by retainer bracket 126, as in FIG. 8. The tabs 124 are not covered by the retainer bracket 126 and are visible in FIG. 9. FIG. 10 is a plan view of the base 120 of FIG. 8, with retainer bracket 126 removed, and showing the slide-able bracket 123 and the springs 125. FIG. 12 is a left side cross-section view of case 100 of FIG. 1, taken just inside of a side of base 120, showing both a spring 125 and the retainer 126.

When inserting a viewing device 40 into the case 100, the viewing device 40 is placed against the tabs 124 and pushed, compressing springs 125 and sliding bracket 123 towards the bottom of case 100, until a top of the viewing device 40 is past two fixed stops 127. The top of the viewing device 40 is then placed closer to the base 120 and held against stops 127 by the force of the compressed springs 125. The stops 127 are bent up from the rest of the base 120 in the example illustrated in FIGS. 8 and 10-12. In other embodiments, there can be a different number of stops or other features known in the art can be used to hold the viewing device 40 against the force of the compressed springs 125.

In the example of FIGS. 8-12, the two tabs 124 are oriented at two angles, respectively, with respect to the direction of the force on the slide-able bracket 123 created by the compressed springs 125. Those two angles are selected to automatically move the viewing device 40 to a desired viewing position that will be under opening 141 when the cover 140 is closed over the base 120. Because of the angular orientations of tabs 124, the slide-able bracket 123 will move a viewing device 40, that is initially off-centered with respect to opening 141 when it is pushed against tabs 124, in a direction with a component perpendicular to the direction of the force on the sliding bracket 123 created by the compressed springs 125. In the example of FIGS. 8-12, the two angles of the two tabs 124, respectively, are of equal angular magnitude but measured in opposite angular directions from the direction of the force on the slide-able bracket 123 created by the compressed springs 125. However, different angles might be chosen to achieve the desired centering depending, for example, on the locations of the tabs 124 relative to opening 141.

As seen in FIG. 12, the slide-able bracket 123 comprises at least one dimple 128 that reduces friction when the slide-able bracket 123 moves relative to the base 120. In addition, tabs 124 and stops 127 can include coatings, such as plastic or rubber, to avoid scratching an edge of a viewing device 40. Similarly, bumpers 129 on base 120 and pads 130 on retainer bracket 126 avoid scratching a bottom surface of a viewing device 40 and reduce friction, when the viewing device 40 is moved to a viewing position by slide-able bracket 123. Bumpers 129 and pads 130 can be composed of plastic or rubber, for example.

Figure 13:
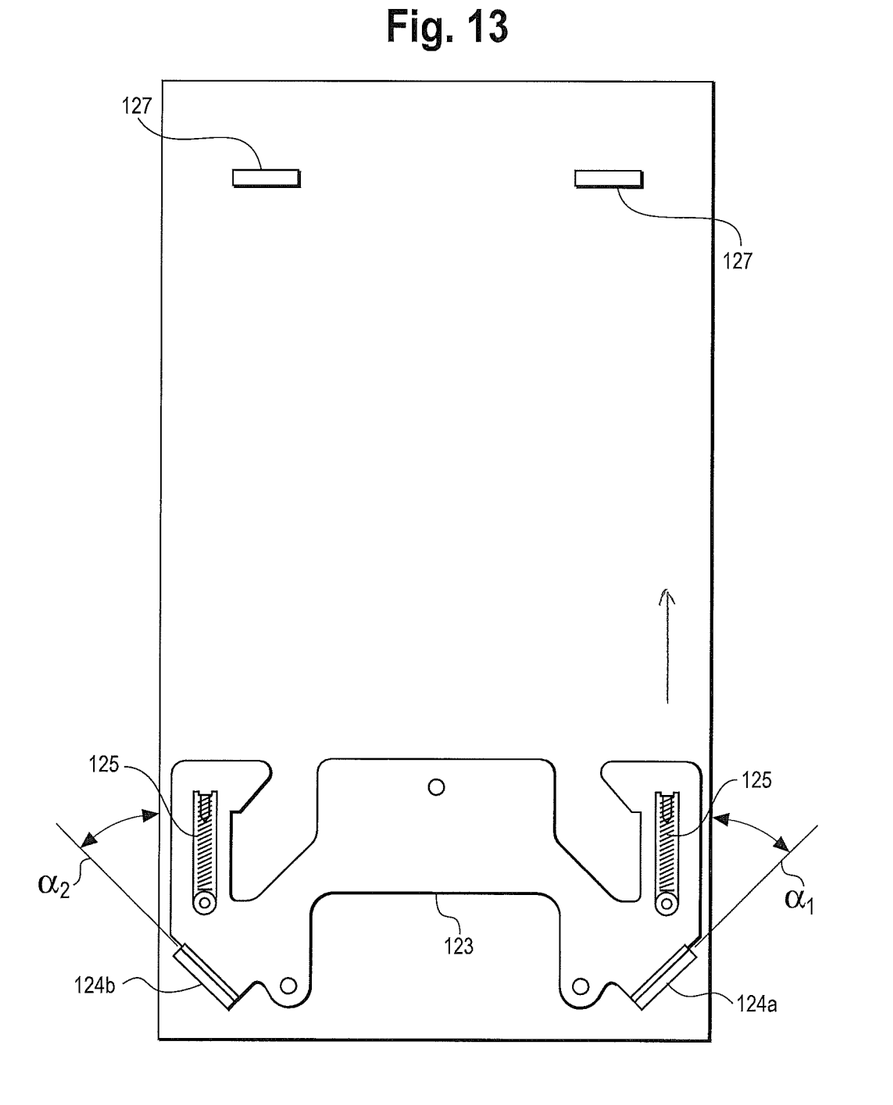
FIG. 13 is a schematic representation of one embodiment of an at least one spring-loaded slide-able bracket of the case of FIG. 1.

FIG. 13 is a schematic representation of one embodiment of an at least one spring-loaded slide-able bracket 123 of the case 100 as seen in FIGS. 1 and 8-12. When compressed, springs 125 create a force on bracket 123 in a first direction indicated by the arrow. Tabs 124a and 124b are oriented at angles $\alpha_1$ and $\alpha_2$, respectively, relative to the first direction. Those two angles may be of equal angular magnitude but measured in opposite angular directions from the first direction. Those two angles are selected to automatically move a viewing device 40, that is initially off-centered with respect to an opening 141 when it is pushed against tabs 124a and 124b, in a direction with a component perpendicular to the first direction.

Figure 14:
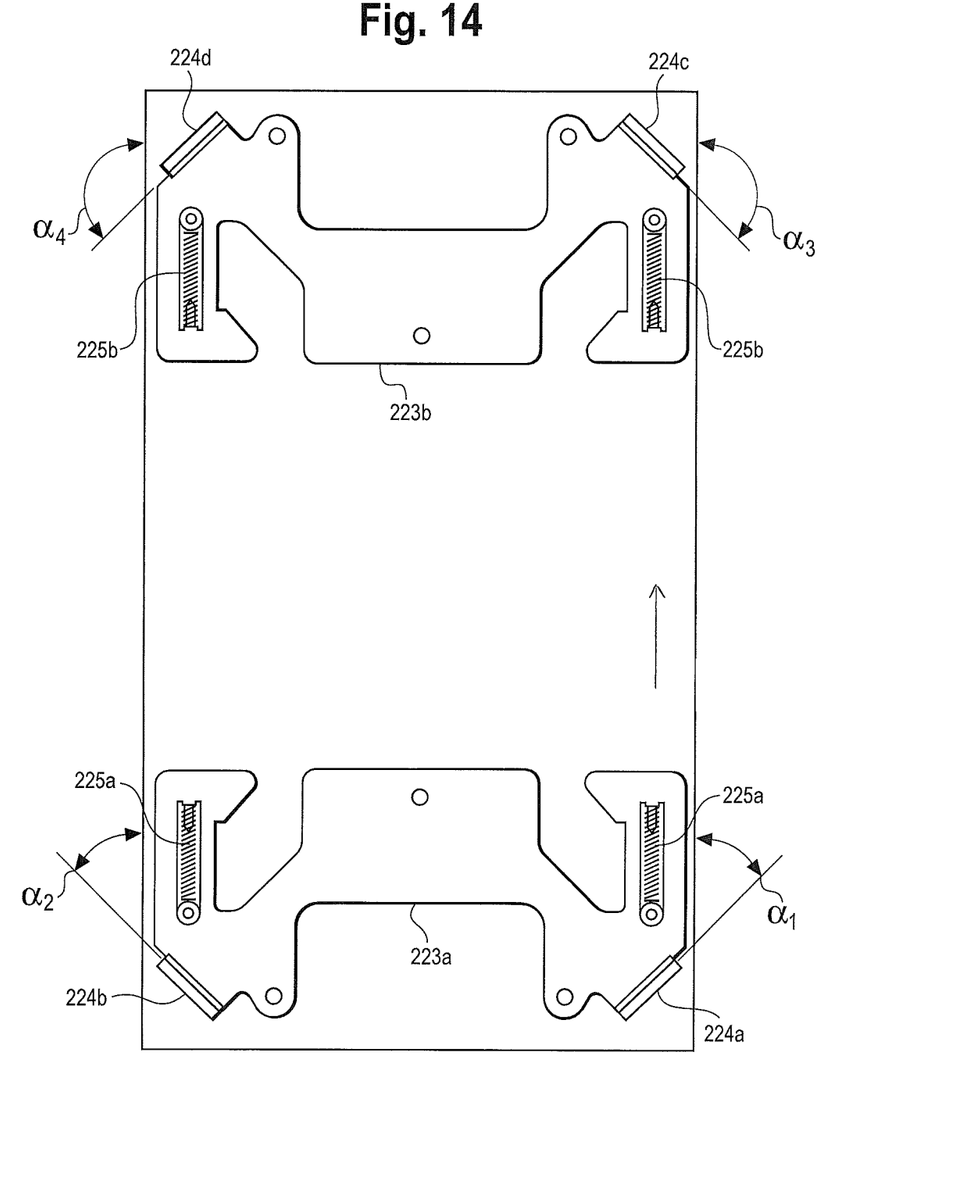
FIG. 14 is a schematic representation of a second embodiment of an at least one spring-loaded slide-able bracket.

FIG. 14 is a schematic representation of a second embodiment of an at least one spring-loaded slide-able bracket. In the illustrated example of this second embodiment, there are two slide-able brackets 223a and 223b. There are no stops 127, and a viewing device 40 is engaged by four tabs 224a, 224b, 224c and 224d. When compressed, springs 225a create a force on bracket 223a in a first direction indicated by the arrow. When compressed, springs 225b create a force on bracket 223b in a second direction that is directly opposite the first direction. Tabs 224a, 224b, 224c and 224d are oriented at angles $\alpha_1$, $\alpha_2$, $\alpha_3$, and $\alpha_4$, respectively, relative to the first direction. Angles $\alpha_1$ and $\alpha_2$ may be of equal angular magnitude but are measured in opposite angular direction from the first direction. Similarly, angles $\alpha_3$ and $\alpha_4$ may be of equal angular magnitude but are measured in opposite angular direction from the first direction. Angles $\alpha_1$ and $\alpha_2$ are selected to automatically move a viewing device 40, that is initially off-centered with respect to an opening 141 when it is pushed against tabs 224a and 224b, in a direction with a component perpendicular to the first direction. Angles $\alpha_3$ and $\alpha_4$ are selected to automatically move a viewing device 40, that is initially off-centered with respect to an opening 141 when it is pushed against tabs 224c and 224d, in a direction with a component perpendicular to the first direction.

Figure 15:
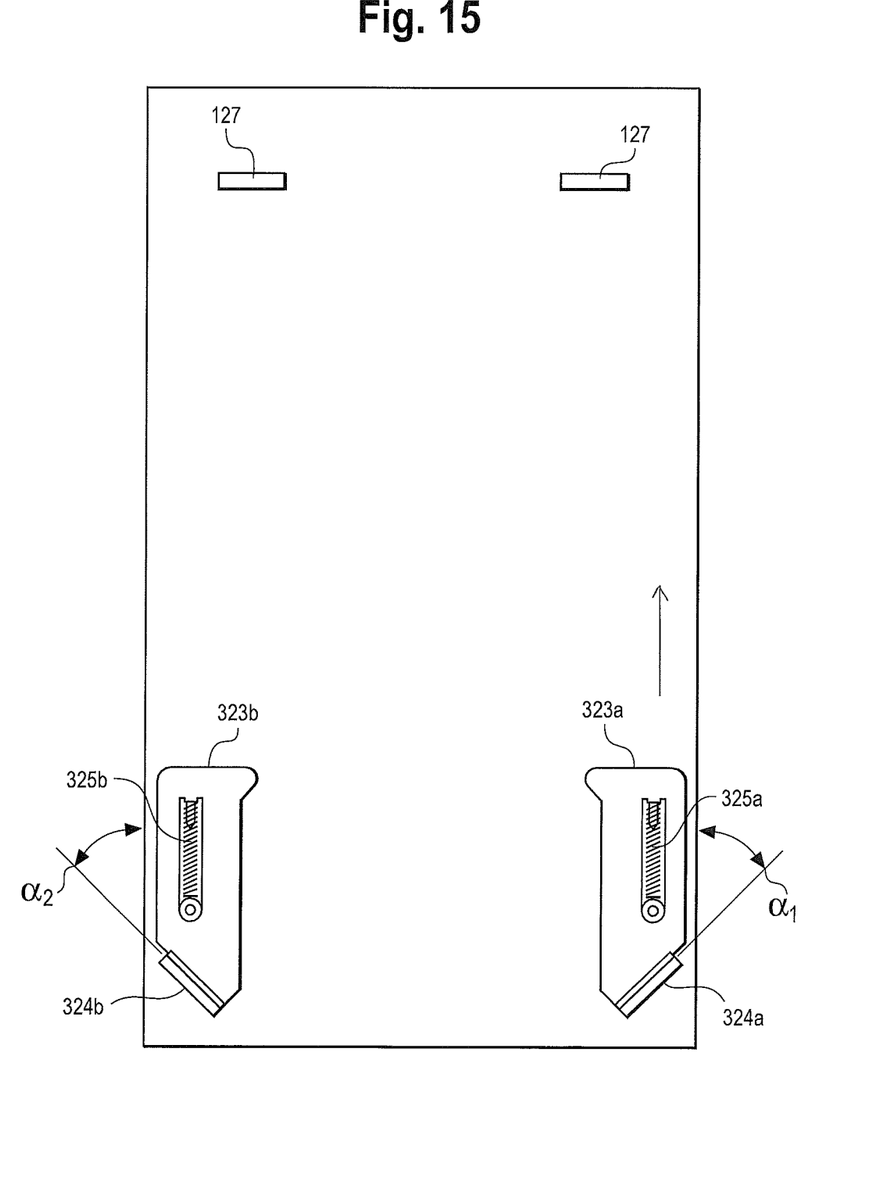
FIG. 15 is a schematic representation of a third embodiment of an at least one spring-loaded slide-able bracket.

FIG. 15 is a schematic representation of a third embodiment of an at least one spring-loaded slide-able bracket. In the illustrated example of this third embodiment, there are two slide-able brackets 323a and 323b. A viewing device 40 is engaged by tabs 324a and 324b, and is held against stops 127. When compressed, spring 325a creates a force on bracket 323a in a first direction indicated by the arrow. When compressed, spring 325b creates a force on bracket 323b in the first direction. Tabs 324a and 324b are oriented at angles $\alpha_1$ and $\alpha_2$, respectively, relative to the first direction. Those two angles may be of equal angular magnitude but are measured in opposite angular direction from the first direction. Those two angles are selected to automatically move a viewing device 40, that is initially off-centered with respect to an opening 141 when it is pushed against tabs 324a and 324b, in a direction with a component perpendicular to the first direction.

Figure 16:
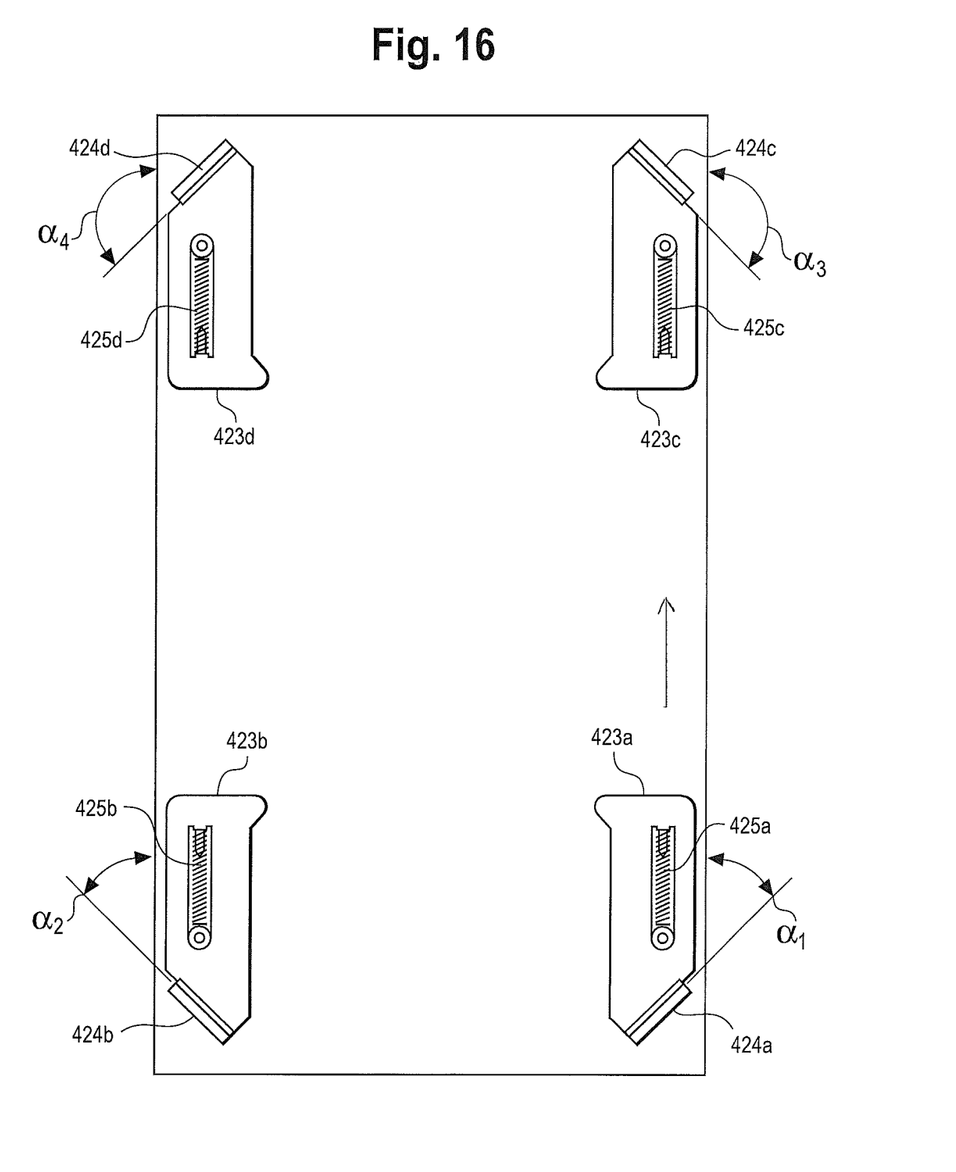
FIG. 16 is a schematic representation of a fourth embodiment of an at least one spring-loaded slide-able bracket.

FIG. 16 is a schematic representation of a fourth embodiment of an at least one spring-loaded slide-able bracket. In the illustrated example of this fourth embodiment, there are four slide-able brackets 423a, 423b, 423c and 423d. There are no stops 127, and a viewing device 40 is engaged by four tabs 424a, 424b, 424c and 424d. When compressed, spring 425a creates a force on bracket 423a in a first direction indicated by the arrow. When compressed, spring 425b creates a force on bracket 423b in the first direction. When compressed, spring 425c creates a force on bracket 423c in a second direction that is directly opposite the first direction. When compressed, spring 425d creates a force on bracket 423d in the second direction. Tabs 424a, 424b, 424c and 424d are oriented at angles $\alpha_1$, $\alpha_2$, $\alpha_3$, and $\alpha_4$, respectively, relative to the first direction. Angles $\alpha_1$ and $\alpha_2$ may be of equal angular magnitude but are measured in opposite angular direction from the first direction. Similarly, angles $\alpha_3$ and $\alpha_4$ may be of equal angular magnitude but are measured in opposite angular direction from the first direction. Angles $\alpha_1$ and $\alpha_2$ are selected to automatically move a viewing device 40, that is initially off-centered with respect to an opening 141 when it is pushed against tabs 424a and 424b, in a direction with a component perpendicular to the first direction. Angles $\alpha_3$ and $\alpha_4$ are selected to automatically move a viewing device 40, that is initially off-centered with respect to an opening 141 when it is pushed against tabs 224c and 224d, in a direction with a component perpendicular to the first direction.

The different illustrated and described embodiments of an at least one spring-loaded slide-able bracket, including the associated springs and the tabs, constitute various self-centering means for automatically centering, under an opening in a cover a case, an electronic display viewing device that is inserted into the case.

From the foregoing, it will be understood that numerous modifications and variations can be effectuated without departing from the true spirit and scope of the novel concepts of the present invention. It is to be understood that no limitation with respect to the specific embodiments illustrated is intended or should be inferred.

What is claimed is:

1. A viewing device case comprising:
   a base;
   a cover that fits over the base so that the case can be closed around an electronic display viewing device after the electronic display viewing device is inserted into the case; and at least one spring-loaded slide-able bracket that engages the electronic display viewing device that is inserted into the case, and that moves the electronic display viewing device that is inserted into the case into a viewing position within the case;

wherein the cover defines an opening through which the electronic display viewing device, that is inserted into the case, can be viewed and touched by the user, when the at least one spring-loaded slide-able bracket moves the electronic display viewing device into the viewing position and the case is closed around the electronic display viewing device;

wherein the at least one spring-loaded slide-able bracket is slide-able in a first direction relative to the base and in a second direction, relative to the base, that is directly opposite the first direction;

wherein the at least one spring-loaded slide-able bracket comprises first and second tabs that are in direct engagement with the electronic display viewing device that is inserted into the case;

wherein the first tab is oriented at a first angle relative to the first direction;

wherein the second tab is oriented at a second angle relative to the first direction; and wherein, in order to center the opening over the electronic display viewing device that is inserted into the case, the first and second angles are selected to automatically move the electronic display viewing device, that is inserted into the case, in a direction with a component perpendicular to the first direction when the at least one spring-loaded slide-able bracket moves the electronic display viewing device, that is inserted into the case, into the viewing position.

2. The viewing device case as in claim 1 wherein the case further comprises a hinge that rotatably attaches the cover to the base.

3. The viewing device case as in claim 1, wherein the case comprises at least one fixed stop against which the at least one spring-loaded slide-able bracket moves the electronic display viewing device, that is inserted into the case, when the at least one spring-loaded slide-able bracket moves the electronic display viewing device into the viewing position.

4. The viewing device case as in claim 1, wherein the first and second angles are of equal angular magnitude but are measured in opposite angular directions from the first direction.

5. The viewing device case as in claim 1, wherein the at least one spring-loaded slide-able bracket comprises:
first and second spring-loaded slide-able brackets; and
first and second springs;
the first spring being operationally connected to the first bracket to create a force on the first bracket in the first direction, when the first spring is compressed; and
the second spring being operationally connected to the second bracket to create a force on the second bracket in the second direction, when the second spring is compressed.

6. The viewing device case as in claim 5, wherein
the first bracket comprises the first and second tabs;
the second bracket comprises third and fourth tabs that are in direct engagement with the electronic display viewing device that is inserted into the case;
the third tab is oriented at a third angle relative to the first direction;
the fourth tab is oriented at a fourth angle relative to the first direction; and in order to center the opening over the electronic display viewing device that is inserted into the case, the third and fourth angles are selected to automatically move the electronic display viewing device, that is inserted into the case, in a direction with a component perpendicular to the first direction when the second bracket moves the electronic display viewing device, that is inserted into the case, into the viewing position.

7. The viewing device case as in claim 6, wherein
the first and second angles are of equal angular magnitude but are measured in opposite angular directions from the first direction; and
the third and fourth angles are of equal angular magnitude but are measured in opposite angular directions from the first direction.

8. The viewing device case as in claim 1, wherein the at least one spring-loaded slide-able bracket comprises:
first and second spring-loaded slide-able brackets; and
first and second springs;
the first spring being operationally connected to the first bracket to create a force on the first bracket in the first direction, when the first spring is compressed;
the second spring being operationally connected to the second bracket to create a force on the second bracket in the first direction, when the second spring is compressed;
the first bracket comprising the first tab; and
the second bracket comprising the second tab.

9. The viewing device case as in claim 8, wherein the first and second angles are of equal angular magnitude but are measured in opposite angular directions from the first direction.

10. The viewing device case as in claim 1, wherein the at least one spring-loaded slide-able bracket comprises:
first, second, third and fourth spring-loaded slide-able brackets;
first, second, third and fourth springs;
the first spring being operationally connected to the first bracket to create a force on the first bracket in the first direction, when the first spring is compressed;
the second spring being operationally connected to the second bracket to create a force on the second bracket in the first direction, when the second spring is compressed;
the third spring being operationally connected to the third bracket to create a force on the third bracket in the second direction, when the third spring is compressed; and
the fourth spring being operationally connected to the fourth bracket to create a force on the fourth bracket in the second direction, when the fourth spring is compressed.

11. The viewing device case as in claim 10, wherein
the first bracket comprises the first tab;
the second bracket comprises the second tab;
the third bracket comprises a third tab that is oriented at a third angle relative to the first direction;
the fourth bracket comprises a fourth tab that is oriented at a fourth angle relative to the first direction;
the third and fourth tabs that are in direct engagement with the electronic display viewing device that is inserted into the case; and
in order to center the opening over the electronic display viewing device that is inserted into the case, the third and fourth angles are selected to automatically move the electronic display viewing device, that is inserted into the case, in a direction with a component perpendicular to the first direction when the third and fourth brackets move the electronic display viewing device, that is inserted into the case, into the viewing position.

12. The viewing device case as in claim 11, wherein
the first and second angles are of equal angular magnitude but are measured in opposite angular directions from the first direction; and
the third and fourth angles are of equal angular magnitude but are measured in opposite directions from the first direction.

13. The viewing device case as in claim 1 wherein the case further comprises a lock for securing the cover in a closed position relative to the base.

14. The viewing device case as in claim 1, wherein the at least one spring-loaded slide-able bracket comprises at least one dimple that reduces friction when the at least one spring-loaded slide-able bracket moves relative to the base.

15. The viewing device case as in claim 1, further comprising:
a retainer bracket;
wherein the at least one spring-loaded slide-able bracket comprises at least one spring that creates a force on the at least one spring-loaded slide-able bracket when the at least one spring is compressed; and
wherein the retainer bracket retains the at least one spring and the at least one spring-loaded slide-able bracket against the base.

16. A combination comprising:
a viewing device case as in claim 1;
and a stand for supporting the viewing device case.

17. The combination as in claim 16, the combination further comprising a swivel mount that attaches the viewing device case to the stand, and that permits adjustment of the orientation of the viewing device case relative to the stand.

18. A viewing device case comprising:
a base;
a cover that can be opened and closed over the base, and can be secured in a closed position relative to the base;
the cover defining an opening through which an electronic display viewing device, that is inserted into the case, can be viewed and touched by a user when the cover is closed over the base; and
a self-centering means for automatically centering, under the opening, the electronic display viewing device that is inserted into the case.

\* \* \* \* \*